United States Patent [19]

Tournier

[11] 4,296,526
[45] Oct. 27, 1981

[54] SKINNING MACHINE FOR THE HEADS AND LIMBS OF SLAUGHTERED ANIMALS

[76] Inventor: Claude Tournier, Lioujas, 12000 Rodez, France

[21] Appl. No.: 100,227

[22] Filed: Dec. 4, 1979

[30] Foreign Application Priority Data

Dec. 4, 1978 [FR] France .................................. 78 34719

[51] Int. Cl.³ ................................................ A22B 5/16
[52] U.S. Cl. ........................................ 17/21; 99/585
[58] Field of Search .................... 17/21, 50, 62; 99/585

[56] References Cited

U.S. PATENT DOCUMENTS

| | | | |
|---|---|---|---|
| 1,847,536 | 3/1932 | Pruefer | 17/21 UX |
| 3,360,026 | 12/1967 | Schill | 17/21 UX |
| 3,729,775 | 5/1973 | McDonald | 17/50 X |

FOREIGN PATENT DOCUMENTS 936976 9/1963 United Kingdom .................... 17/62

Primary Examiner—Willie G. Abercrombie
Attorney, Agent, or Firm—Larson and Taylor

[57] ABSTRACT

The present invention relates to a skinning machine for the head and limbs of slaughtered ungulate animals. Such a machine is constituted by a frame on which are mounted: on the one hand, two horizontally parallel rollers pivoting in bearings associated with said frame. Said rollers are preferably grooves and one at least of them is a drive roller. They are sufficiently separated peripherally to introduce a previously cut flap of skin and are driven in opposite directions of rotation. They thereby exert a peripheral friction on said skin, in order to bare the processed animal part. The machine comprises on the other hand, an articulated work table ensuring the support and holding of the animal part being processed.

3 Claims, 1 Drawing Figure

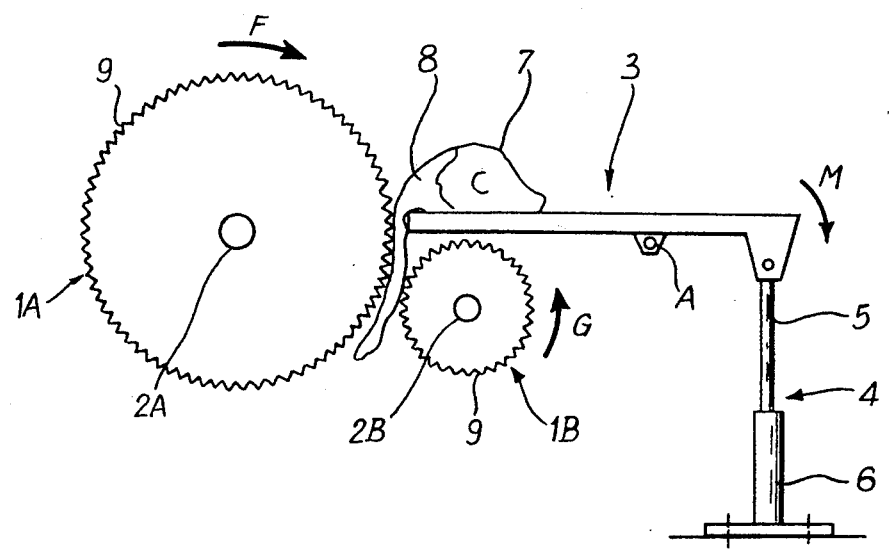

SKINNING MACHINE FOR THE HEADS AND LIMBS OF SLAUGHTERED ANIMALS

BACKGROUND OF THE INVENTION

1. Field of the Invention

The technical field of the invention is that of the external processing of animal carcasses, such as veal, beef, mutton or horseflesh. More particularly, the present invention relates to a skinning machine for animal members such as the head and the feet.

2. Description of the Prior Art

In general, current commercial machines have been designed for processing the sides of animals and this, by reason of the greater surface area of skin protecting this part of the animal body, rather than for processing the head or the feet. This is explained by the fact that the recovery of these skins is principally oriented towards the manufacture of footwear and articles of cothing which, obviously, require the processing of relatively large surface areas.

Now, for some years past the slaughtering of animals having reached industrial proportions and the recovery of the skin on the head and the feet being possibly useful for the production of organic fertilizers, applicant has therefore carried out researches enabling the external processing of a maximum number of heads or feet per minimum unit time to be achieved in order that the recovery of the skins for the production of fertilizers may be distinctly profitable.

GENERAL DESCRIPTION OF THE INVENTION

These researches have resulted in the provision of the machine according to the invention characterized in that it is constituted by a frame on which are mounted:
  on the one hand, two horizontally parallel rollers pivoting in bearings associated with said frame, which rollers, preferably grooved and of which one at least is a drive roller, are sufficiently separated peripherally to introduce a previously cut flap of skin and are driven in rotations in opposite directions, by exerting peripheral friction on said skin, in order to bare the animal part to be processed;
  and on the other hand, a pivoted work table ensuring the support and holding of said animal part to be processed.

It will be understood from this point that, according to the length of the rollers and consequently that of the work table, it is possible to process more than one and preferably two, head or feet at the same time.

A preferred embodiment of the skinning machine according to the invention is described below, by way of non-limiting example and with reference to the accompanying drawing, for the purpose of showing other features and advantages of the present invention.

DESCRIPTION OF THE DRAWING AND OF A PREFERRED EMBODIMENT

The single FIGURE of the drawing is a diagrammatic view in vertical cross-section of an embodiment of a machine according to the invention.

The machine shown in this drawing comprises two rollers 1A and 1B of different diameters, articulated on axles 2A and 2B mounted pivotably in bearings associated with the frame of the machine. This frame, formed of longitudinal members defining a logical structure of the machine, is not shown as not contributing anything more to the sound understanding of the invention since its only purpose is to serve as a support for the different members of said machine.

The presence will be noted of a work table 3 arranged above the roller 1B and articulated on a support point A by means of a hydraulic jack 4 whose body 6 is fast to the frame and whose head 5 is articulated at one of the ends of the table 3. The actuation of the jack 4 and the support point A thus determine the movement of the table, illustrated by an arrow M.

The role of this table 3 is on the one hand, to ensure the support and the holding of the parts to be skinned and in the case of the example selected, of a sheep's head 7, and on the other hand, to facilitate the engagement of the skin 8 between the two rollers 1A and 1B since its articulation permits a previously cut flap of skin to be pinched on the periphery of the roller 1A on which are arranged drive means enabling its rotation in the direction indicated by an arrow F.

It will also be observed that the peripheral surface of the rollers 1A and 1B is provided with grooves 9 formed along the generators of the cylinders and intended to clamp the skin 8, thus ensuring forced guidance of the latter between the peripheral separation of the two rollers in order to complete the skinning of the head 7.

The rotation of the roller 1B may be free and in this case its roll is passive since it serves as a movable support base for the action of the force exerted on the roller 1A on the skin 8, or may be a drive roller in the direction indicated by arrow G in order to improve the skin tearing off characteristics. Obviously, in this second case, the rotary speed of the roller 1B will be distinctly faster in order to obtain the same linear speed of the grooves 9 for each of the two rollers.

It is useful to specify that when the skinning of the head 7 is finished, the jack 4 is actuated, thus disengaging the table 3 from the roller 1A in order to make it available for a further operation.

Of course, the invention is not limited to the embodiment described and shown above, from which it would be possible to provide other embodiments notably in the arrangement of the functional members of the machine, without however departing from the scope of the invention as defined by the following claims.

I claim:

1. Skinning machine, especially for the external processing of a part of a slaughtered animal, comprising a frame, two parallel horizontal rolls rotationally mounted in bearings connected to the said frame, one at least of the said rolls being a drive roll, the rolls being sufficiently separated from each other at their peripheries to allow introduction between them of a flap of skin and to remove said skin by peripheral friction by rotation in opposite directions, a work table allowing support and maintenance of the part that is to be processed, said work table being movably mounted between a first position remote from the drive roll and a second position close to the drive roll with the drive roll being disposed in an extension of the said work table at a short distance from the end of the said table, such that a flap of skin extending over the said end of the table is gripped between the said end and the drive roll to thus initiate gripping of the skin by the drive roll, the second roll being disposed below the said table.

2. Skinning machine according to claim 1, wherein both rollers are drive rollers.

3. Skinning machine according to claim 1, wherein the work table is articulated by means of a jack.

* * * * *